United States Patent [19]

Baker et al.

[11] 4,281,951
[45] Aug. 4, 1981

[54] CONTAINER PEDESTAL SUPPLEMENTAL LOCK

[75] Inventors: Thomas B. Baker; Richard J. Mandrell, both of St. Charles, Mo.

[73] Assignee: ACF Industries, Inc., New York, N.Y.

[21] Appl. No.: 111,505

[22] Filed: Jan. 11, 1980

[51] Int. Cl.³ .......................... B60P 7/10; B65J 1/22; B61D 45/00
[52] U.S. Cl. ........................................ 410/70; 292/74; 296/167
[58] Field of Search ..................... 410/81, 70; 296/167, 296/179; 248/119 A; 292/74, 76; 220/55 G

[56] References Cited

U.S. PATENT DOCUMENTS 3,498,238  3/1970  Sweger ................................. 410/70
3,827,375  8/1974  Terlecky et al. .................... 410/70

Primary Examiner—Richard A. Bertsch
Attorney, Agent, or Firm—Henry W. Cummings

[57] ABSTRACT

In a container pedestal (10) a supplemental lock (42) is movable to a weighted position tending to maintain the spring (34) biased pedestal latch (22) from pivoting into a position to allow entry or exit of containers (C) from the pedestal.

12 Claims, 4 Drawing Figures

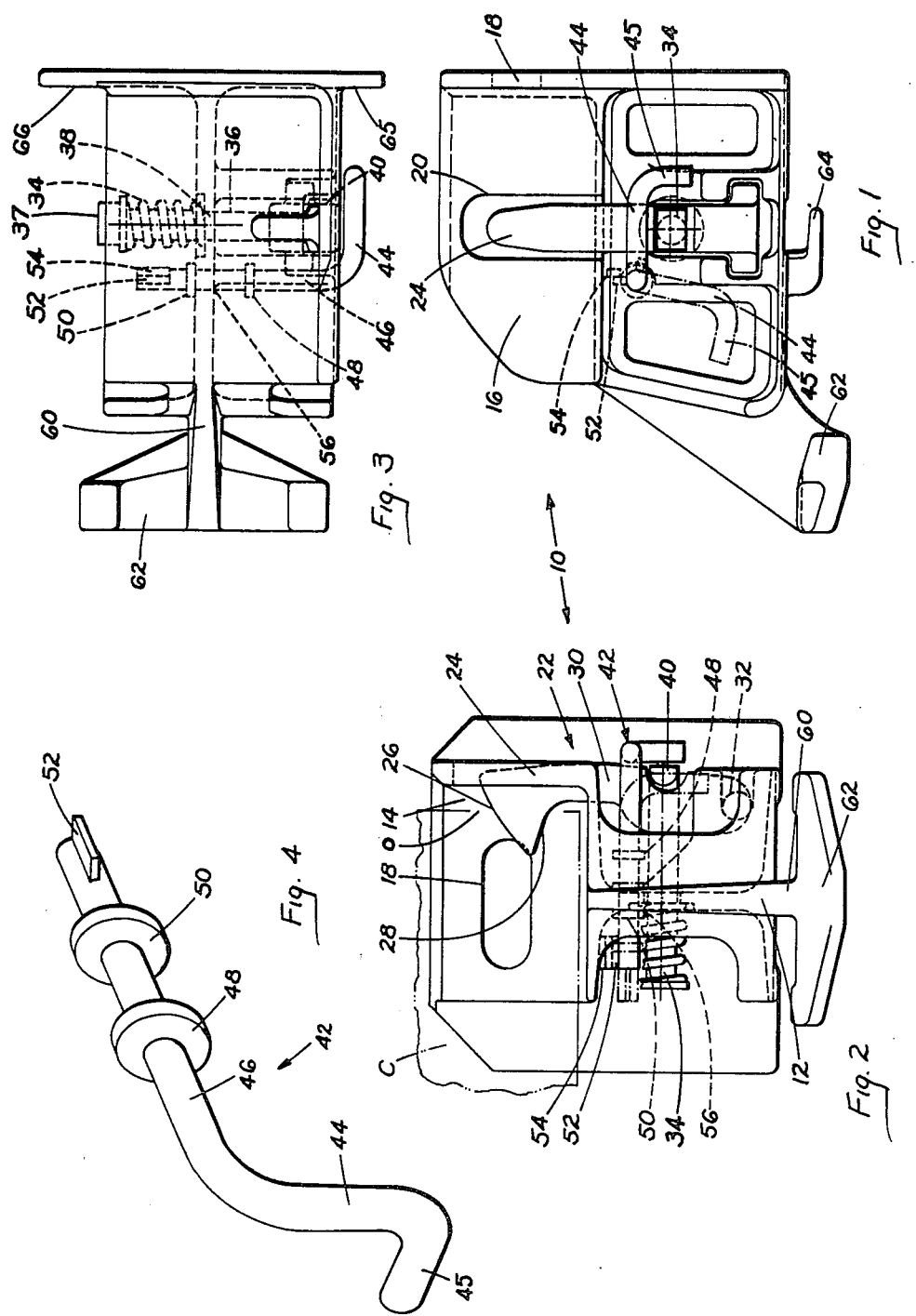

CONTAINER PEDESTAL SUPPLEMENTAL LOCK

BACKGROUND OF THE INVENTION

In conventional container pedestals a spring biased latch having an inclined nose is engaged by the container as the container descends into position on the pedestal, and when the container exits from the pedestal.

In the event that the pedestal spring becomes broken it would be desirable to have a supplemental lock to hold containers in place on the pedestal.

Furthermore, if the pedestal spring is operative but under design force it would also be desirable to prevent the container from escaping from the pedestal in transit when the car is impacted or when rough track is traversed.

SUMMARY OF THE INVENTION

In a container pedestal a spring biased latch is pivotably mounted above a horizontal axis and includes a nose extending through an opening in the pedestal. The nose includes upper and lower inclined surfaces which are engaged by the container respectively as the container enters the pedestal and exits from the pedestal. A supplemental locking member extends horizontally through openings in the pedestal base. The supplemental lock includes a movable lug which is rotatable to a weighted position engaging a fixed lug on the pedestal. In this position the supplemental lock prevents the latch from pivoting about its horizontal axis to allow exit or entry of containers. Preferably the handle is located at least about 90° from the vertical to maintain the weighted position during coupling impacts and when rough track is traversed. Preferably the handle includes a weighted end to increase the moment caused by gravity acting on the handle tending to hold the handle in the weighted position.

A pair of stops are provided on the supplemental lock, one of which engages the base in the weighted position and another which engages the base when the locking member assumes an inoperative, stored position.

THE DRAWINGS

FIG. 1 is a side elevation view of a container pedestal illustrating the supplemental lock of the present invention.

FIG. 2 is a front elevation view of FIG. 1 illustrating the supplemental lock and its stops.

FIG. 3 is a plan view of a pedestal illustrating the supplemental lock of the present invention.

FIG. 4 is a detail view in perspective of the supplemental lock of the present invention.

DESCRIPTION OF PREFERRED EMBODIMENTS

In the drawings a container pedestal 10 includes a base 12 extending upwardly which supports a pair of walls 14 and 16. Each of the walls 14 and 16 have openings 18 and 20. A pedestal latch 22 includes a nose 24 having a pair of inclined surfaces 26 and 28. The latch includes a body portion 30 which is pivoted about a horizontal axis by means of a pin 32. The pedestal is biased into a position extending within opening 20 by means of a spring 34 surrounding a rod 36 and held in place with a nut 37. Rod 36 extends through an opening 38 in base 12. Rod 36 is connected to latch body portion 30 with a pin 40. U.S. Pat. No. 3,827,375 may be referred to for a more detailed description of latch member 22 and spring 34.

In accordance with the present invention a supplemental locking member 42 includes a handle portion 44 extending at a right angle to handle 44, having a weighted end 45 and a shaft portion 46. A pair of stops 48 and 50 are welded to the shaft portion 46. Attached to the inner end of shaft portion 46 is a movable lug 52. A fixed lug 54 is welded to the pedestal. Shaft portion 46 extends through an opening 56 in base portion 12. During assembly stop 50 and lug 52 are welded in place after the shaft portion 46 is inserted through opening 56.

As is described in greater detail in U.S. Pat. No. 3,827,375, a container C having an opening O descends downwardly towards the pedestal 10. When the container engages the surface 26 the weight of the container moves the latch member from left to right in FIG. 2 against the bias of spring 34 until the opening O in the container aligns with the latch nose 24. At this point the latch nose enters the opening O and the container remains in this position in transit. To retain latch member 22 and container C in this position, the locking handle 44 is rotated clockwise in FIG. 1 from the position shown in dotted lines to the position shown in solid lines. This moves the movable lug 52 into engagement with the fixed lug 54. When the handle 44 assumes the position extending horizontally, longitudinally of the pedestal, and the weighted end 45 extends downwardly, the movable lug 52 is in an overcenter position in abutting engagement with fixed lug 54. It is apparent that in this position the latch member 22 is prevented from pivoting about its horizontal axis 32 by means of handle 44 and its weighted end. Lug 52 is located on shaft 46 such that when lug 52 abuts lug 54, handle 44 will have rotated sufficiently that gravity acting on the handle and weight 45 will cause a clockwise movement about shaft 46. It is preferred that handle 44 be located at least about 90° from the vertical in the weighted position to ensure that the handle will not bounce out of the weighted position during coupling impacts or when rough track is traversed. The weight of end portion 45 is helpful in this regard.

When it is desired to remove the container the handle 44 is rotated counterclockwise in FIG. 1 to the position shown in dotted lines. In this position locking member 22 is no longer obstructed by handle 44 and an upward force exerted upon the container C by an overhead crane (not shown) will pivot the latch member 22 about the pin 32 until such time as latch nose 24 is outside the container opening O. When the container is fully exited from the pedestal, the latch nose 24 assumes its original position due to the bias of spring 34.

When not in use it is convenient to store supplemental lock 42 in the position shown in phantom lines in FIG. 2 wherein the handle portion is forced inwardly until stop 48 engages base 12.

Base 12 includes a guide portion 60 having a transverse extension portion 62 which extends below the deck when a pedestal is installed in a railway flat car. In addition, a pair of transversely spaced extensions 64 are provided to extend into openings located in the deck to fix the pedestal at a given longitudinal position. In the retracted position within the deck, outwardly extending flanges 65 and 66 rest upon the deck.

To again utilize supplemental lock 42, handle 44 is moved outwardly until stop 50 engages the other surface of base 12 (FIGS. 2 and 3).

It will be apparent that the supplemental lock of the present invention is inexpensive and is readily installed into existing pedestals by merely drilling the opening 56 into base 12, inserting the shaft portion 46 of the supplemental lock including stop 48, and then welding in place the stop 50 and lug 52 which maintain the supplemental lock captive within the base 12.

What is claimed is:

1. In a container pedestal including a base and a spring biased latch pivotably mounted about a horizontal axis and having a nose extending through an opening in the pedestal; said nose including upper and lower inclined surfaces which are engaged by the container respectively as the container enters the pedestal and exits from the pedestal; the improvement comprising: a supplemental locking member extending horizontally through an opening in said base; said supplemental locking member including a movable lug rotatable to a weighted position engaging a fixed lug on the pedestal; thereby tending to prevent the latch from pivoting about its horizontal axis to allow exit or entry of containers.

2. A container pedestal supplemental locking member according to claim 1 wherein said handle is located at least about 90° from the vertical in said weighted position.

3. A container pedestal supplemental locking member according to claim 2 wherein said handle portion includes a weighted end to aid in maintaining said handle in said weighted position.

4. A container pedestal supplemental locking member according to claim 1 wherein said handle portion includes a weighted end to aid in maintaining said handle in said weighted position.

5. Container pedestal supplemental locking member according to claim 1 including a first stop mounted on a shaft portion of said supplemental locking member which engages said base in the weighted position.

6. Container pedestal supplemental locking member according to claim 5 wherein said locking member includes a second stop mounted on said shaft portion which engages said base when the locking member assumes a stored position.

7. A container pedestal comprising: a base supporting a horizontal container support surface and a pair of vertical container guide surfaces; a spring biased latch pivotably mounted about a horizontal axis including a nose extending through an opening in one of said vertical guide surfaces; said nose including upper and lower inclined surfaces; said upper surface engaged by the container as the container enters the pedestal, and said lower surface engaged by the container as it exits from the pedestal; a supplemental locking member extending horizontally through an opening in said base; said supplemental locking member including a movable lug which is rotatable to a weighted position engaging a fixed lug on said pedestal; thereby tending to prevent said latch from pivoting about its horizontal axis to allow exit or entry of containers.

8. A container pedestal according to claim 7 wherein said handle is located at least about 90° from the vertical in said weighted positions.

9. A container pedestal according to claim 8 wherein said handle portion includes a weighted end to aid in maintaining said handle in said weighted position.

10. A container pedestal according to claim 7 wherein said handle portion includes a weighted end to aid in maintaining said handle in said weighted position.

11. A container pedestal according to claim 7 including a first stop mounted on a shaft portion of said supplemental locking member which engages said base in the weighted position.

12. A container pedestal according to claim 11 including a second stop on said shaft portion which engages said base when the locking member assumes a stored position.

* * * * *